United States Patent
Watanabe

(10) Patent No.: US 7,184,271 B2
(45) Date of Patent: Feb. 27, 2007

(54) MAGNETIC DISK LOADING APPARATUS

(75) Inventor: Takashi Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 130 days.

(21) Appl. No.: 11/128,381

(22) Filed: May 13, 2005

(65) Prior Publication Data

US 2006/0187648 A1    Aug. 24, 2006

(30) Foreign Application Priority Data

Feb. 18, 2005  (JP) ............................. 2005-042227

(51) Int. Cl.
*G01F 1/16* (2006.01)

(52) U.S. Cl. ............. 361/727; 361/684; 361/685; 361/724; 174/50; 174/69; 312/223.6; 211/26

(58) Field of Classification Search ................ 361/679, 361/684, 685, 686, 714–727; 248/632, 634, 248/636, 638, 610, 611, 614, 645, 672, 673; 360/97.01, 99.02, 97.02, 97.03, 99.06, 97.04, 360/98.01, 26, 103–106; 312/223.6, 35, 312/323, 321; 211/26, 26.2; 174/48, 49, 174/69, 72 A, 72 C, 72 R, 97, 135
See application file for complete search history.

(56) References Cited

U.S. PATENT DOCUMENTS

| | | | | |
|---|---|---|---|---|
| 3,295,905 A | * | 1/1967 | Sisk et al. .................. | 312/273 |
| 4,614,383 A | * | 9/1986 | Polley et al. ................ | 312/273 |
| 5,890,602 A | * | 4/1999 | Schmitt ...................... | 211/13.1 |
| 6,326,547 B1 | * | 12/2001 | Saxby et al. ................. | 174/69 |
| 6,459,571 B1 | * | 10/2002 | Carteau ...................... | 361/684 |
| 6,469,970 B2 | * | 10/2002 | Nishi ......................... | 720/685 |
| 6,501,020 B2 | * | 12/2002 | Grant et al. .................. | 174/50 |
| 6,501,645 B1 | * | 12/2002 | Hanazawa et al. .......... | 361/685 |
| 7,097,047 B2 | * | 8/2006 | Lee et al. .................... | 211/26.2 |

FOREIGN PATENT DOCUMENTS

| JP | 5-15039 | 1/1993 |
|---|---|---|
| JP | 2004-40847 | 2/2004 |

* cited by examiner

*Primary Examiner*—Michael Datskovskiy
(74) *Attorney, Agent, or Firm*—Staas & Halsey LLP

(57) ABSTRACT

Provided is a magnetic disk loading apparatus making it easy to perform the work of replacing a magnetic disk unit or any other component with a new one or the work of maintaining or inspecting it, and accommodating a larger number of magnetic disk units. A magnetic disk loading apparatus comprises magnetic disk units stored in a disk enclosure, and a cable container located in a place within the disk enclosure other than the place where the magnetic disk unit is located. The magnetic disk loading apparatus is designed so that the disk enclosure can be inserted into or pulled out of the magnetic disk loading apparatus from the front side of the magnetic disk loading apparatus. Cables contained in the cable container are coupled to the magnetic disk unit, and encased in a cable guide that can be bent or stretched along with the insertion or the pulling-out of the disk enclosure.

5 Claims, 4 Drawing Sheets

MAGNETIC DISK LOADING APPARATUS

BACKGROUND OF THE INVENTION

1. Field of the Invention

The present invention relates to a magnetic disk loading apparatus and, more particularly, to a magnetic disk loading apparatus including a cable container mechanism that makes it easy to maintain magnetic disk units or other components.

2. Description of the Related Art

A magnetic disk loading apparatus for loading numerous magnetic disk units is known.

FIG. 5 is a perspective view showing the appearance of a conventional magnetic disk loading apparatus. In the drawing, there are shown a magnetic disk loading apparatus 51, disk enclosures 52, and magnetic disk units 53. As illustrated, the magnetic disk units 53 are stored in the disk enclosures 52 so that the face of the magnetic disk loading apparatus will be flush with the faces of the magnetic disk units 53. The disk enclosure 52 may have a multistory structure or a single-story structure.

Referring to FIG. 5, the magnetic disk units 53 are mounted on the face of the magnetic disk loading apparatus 51. Some magnetic disk loading apparatuses have magnetic disk units mounted on both the fronts and the backs thereof.

In general, magnetic disk units are susceptible to vibration. Even for maintenance, for inspection or for replacement, moving the magnetic disk units 53 within the magnetic disk loading apparatus 51 is seldom considered.

As a prior art, Japanese Unexamined Patent Application Publication (Kokai) No. 4-333003 is known.

Conventionally, magnetic disk units are mounted in a magnetic disk loading apparatus so that the faces of the magnetic disk units will be flush with the face or back of the magnetic disk loading apparatus. Therefore, a vacant area in the magnetic disk loading apparatus cannot be utilized effectively. The number of magnetic disk units that can be mounted in the magnetic disk loading apparatus is limited to a value not causing the sum total of the areas of the faces of the magnetic disk unit to exceed the area of the face or back of the magnetic disk loading apparatus. This poses a problem in that the maximum number of magnetic disk units mounted in the magnetic disk loading apparatus is small.

In order to solve the above problem, a disk enclosure is structured so that the disk enclosure having magnetic disk units stored therein can be pulled out of a magnetic disk loading apparatus. In this case, the magnetic disk units are moved, along with the movement of the disk enclosure, even though various cables coupled to the magnetic disk units are not straightened. Consequently, the work of maintaining the magnetic disk units or inspecting the cables becomes difficult.

SUMMARY OF THE INVENTION

Accordingly, an object of the present invention is to provide a magnetic disk loading apparatus accommodating a larger number of magnetic disk units.

Another object of the present invention is to provide a magnetic disk loading apparatus making it easy to carry out the work of maintaining or inspecting the magnetic disk units.

In order to accomplish the above objects, according to the first aspect of the present invention, there is provided a magnetic disk loading apparatus comprising magnetic disk units stored in a disk enclosure, and a cable container located in a place within the disk enclosure other than a place where the magnetic disk units are disposed. The disk enclosure included in the magnetic disk loading apparatus can be inserted into or pulled out of the magnetic disk loading apparatus from the front side of the magnetic disk loading apparatus. Cables contained in the cable container are coupled to the magnetic disk units and encased in a cable guide that can be bent or stretched along with the insertion or pulling out of the disk enclosure.

According to the second aspect of the present invention, the magnetic disk units are stored in the disk enclosure so that their faces will be oriented in a direction orthogonal to the face of the disk enclosure.

According to the third aspect of the present invention, the cable guide has partition panels that differentiate places where different kinds of cables are encased.

According to the fourth aspect of the present invention, the cable guide has buffer cushions placed on the partition panels.

According to the fifth aspect of the present invention, the cable container is disposed in a place within the disk enclosure other than the place where components are arranged. The cables contained in the cable container are coupled to the magnetic disk units. One end of each cable is fixed at one point in the disk enclosure so that the cables can be turned, and the other end of each cable is attached to any place within the disk enclosure other than the place where the components are arranged so that the other end of the cable can be detached and the cable can be turned. When the components are dismounted from the disk enclosure for the purpose of maintenance, if the cables interrupt the work of dismounting, the cables are turned to lie outside the disk enclosure or the positions at which the other ends of the cables are fixed are changed from one position to another so that the components can be dismounted from the disk enclosure.

According to the first to fourth aspects of the present invention, the disk enclosure can be inserted into or pulled out of the magnetic disk loading apparatus from the front side of the magnetic disk loading apparatus. For the work of maintaining or inspecting the magnetic disk units, the disk enclosure should merely be pulled out of the magnetic disk loading apparatus. The cables are moved within the cable container while being straightened up. Consequently, annoyance caused by the work of maintenance or inspection will be markedly alleviated.

Moreover, the magnetic disk units are stored in the disk enclosure so that their faces will be oriented in a direction orthogonal to the face of the disk enclosure. Compared with the conventional apparatus, a larger number of magnetic disk units can be mounted in the disk enclosure.

Furthermore, according to the fifth aspect of the present invention, when components are replaced with new ones or maintained or inspected, even if the cables interrupt the work, the position of the cables can be shifted easily. Consequently, maintenance or inspection of the components or replacement thereof can be easily achieved.

DESCRIPTION OF THE PREFERRED EMBODIMENTS

Figure 1:
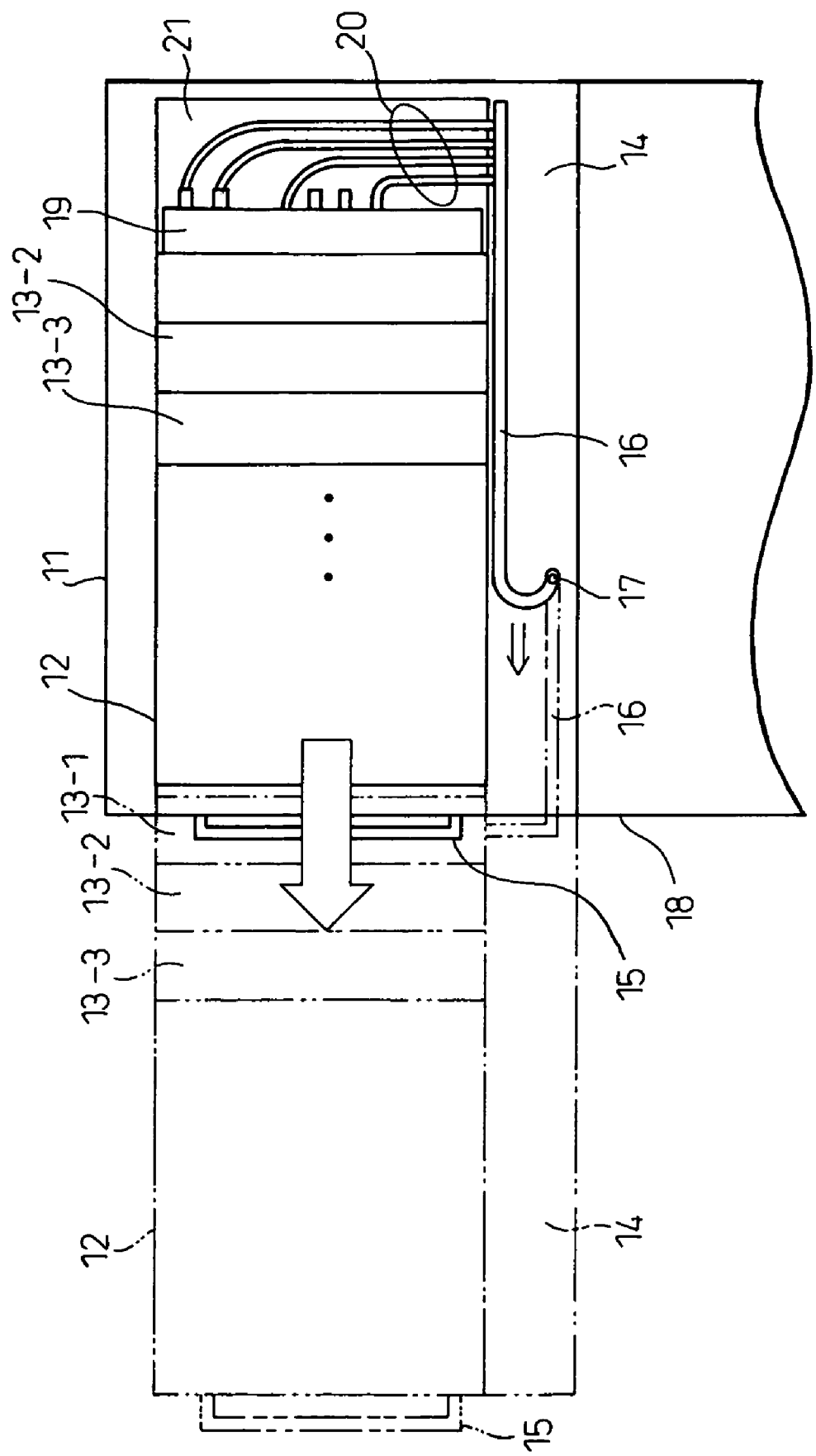
FIG. 1 is a side view showing the appearance of a magnetic disk loading apparatus in accordance with the first embodiment of the present invention.

Referring to the drawings, embodiments of the present invention will be described below. The same reference numerals will denote the same components throughout the drawings.

FIG. 1 is a side view showing the appearance of a magnetic disk loading apparatus in accordance with the first embodiment of the present invention. In the drawing, there are shown a magnetic disk loading apparatus 11, a disk enclosure 12, magnetic disk units 13-1, 13-2, 13-3, etc., a cable container 14, a pull 15 with which the disk enclosure is pulled out of the magnetic disk loading apparatus, and a flexible cable guide 16 realized with, for example, a locally procurable chain guide whose section has a oblong rectangular shape and to which a chain is attached.

The cable guide 16 accommodates signal lines, ac and dc power cables, and optical fibers that are coupled to the magnetic disk units 13-1, 13-2, etc. FIG. 1 shows only the cables coupled to the magnetic disk unit 13-1 among all the cables encased in the cable guide. The cable guide in which the cables coupled to the other magnetic disk units 13-2, 13-3, etc. are also encased is contained in the cable container. Reference numeral 17 denotes a fixing point in the magnetic disk loading apparatus 11 at which the cable guide 16 is fixed. Reference numeral 18 denotes the face of the magnetic disk loading apparatus. Reference numeral 19 denotes a printed-circuit board coupled to back panels of the magnetic disk units. Reference numeral 20 denotes a group of cables routed to terminals formed on the printed-circuit board 19. Reference numeral 21 denotes a routing space for the group of cables 20.

The magnetic disk units 13-1, 13-2, 13-3, etc. are inserted from the flank of the magnetic disk loading apparatus 11 into the back panel. (not shown). In the illustrated state, the faces of the magnetic disk units 13-1, 13-2, 13-3, etc. are flush with the flank of the magnetic disk loading apparatus 11. The back panels are coupled to the printed-circuit board 19. The group of cables 20 to be coupled to the magnetic disk units 13-1, 13-2, 13-3, etc. are spliced to terminals or connectors formed on the printed-circuit board 19.

Figure 2:
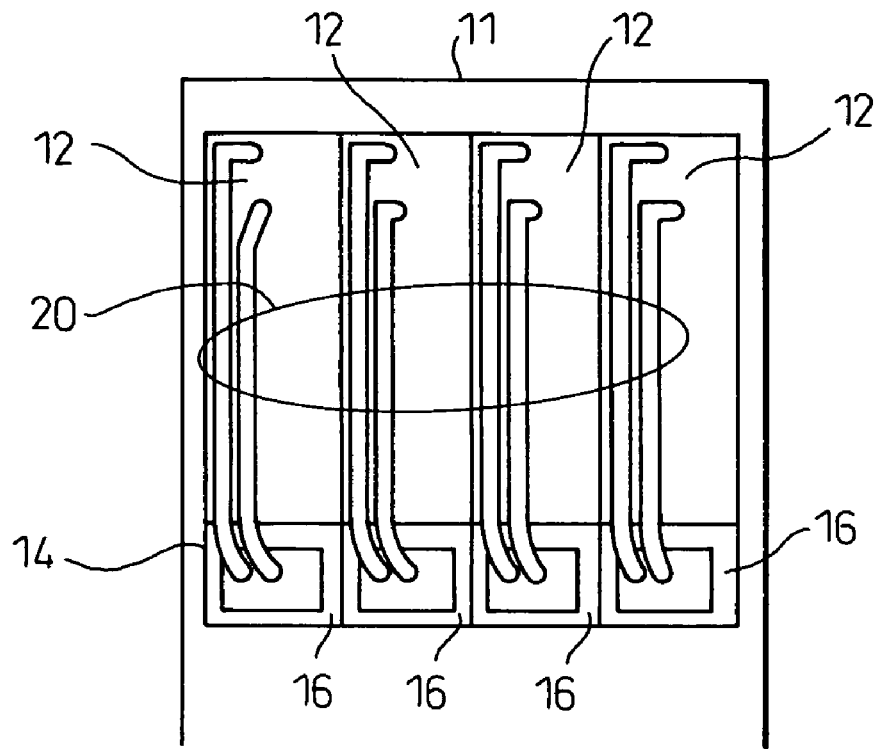
FIG. 2 is a back view of the magnetic disk loading apparatus shown in FIG. 1 and seen in a direction of A.

FIG. 2 is a back view showing the magnetic disk loading apparatus 11 shown in FIG. 1 in a direction of A. In the drawing, four disk enclosures 14 are juxtaposed. The number of disk enclosures is not limited to four but may be larger or smaller. The cable guides 16 are contained in the respective cable containers 14. As mentioned above, the group of cables 20 coupled to the magnetic disk units is encased in each of the cable guides 16.

Figure 5:
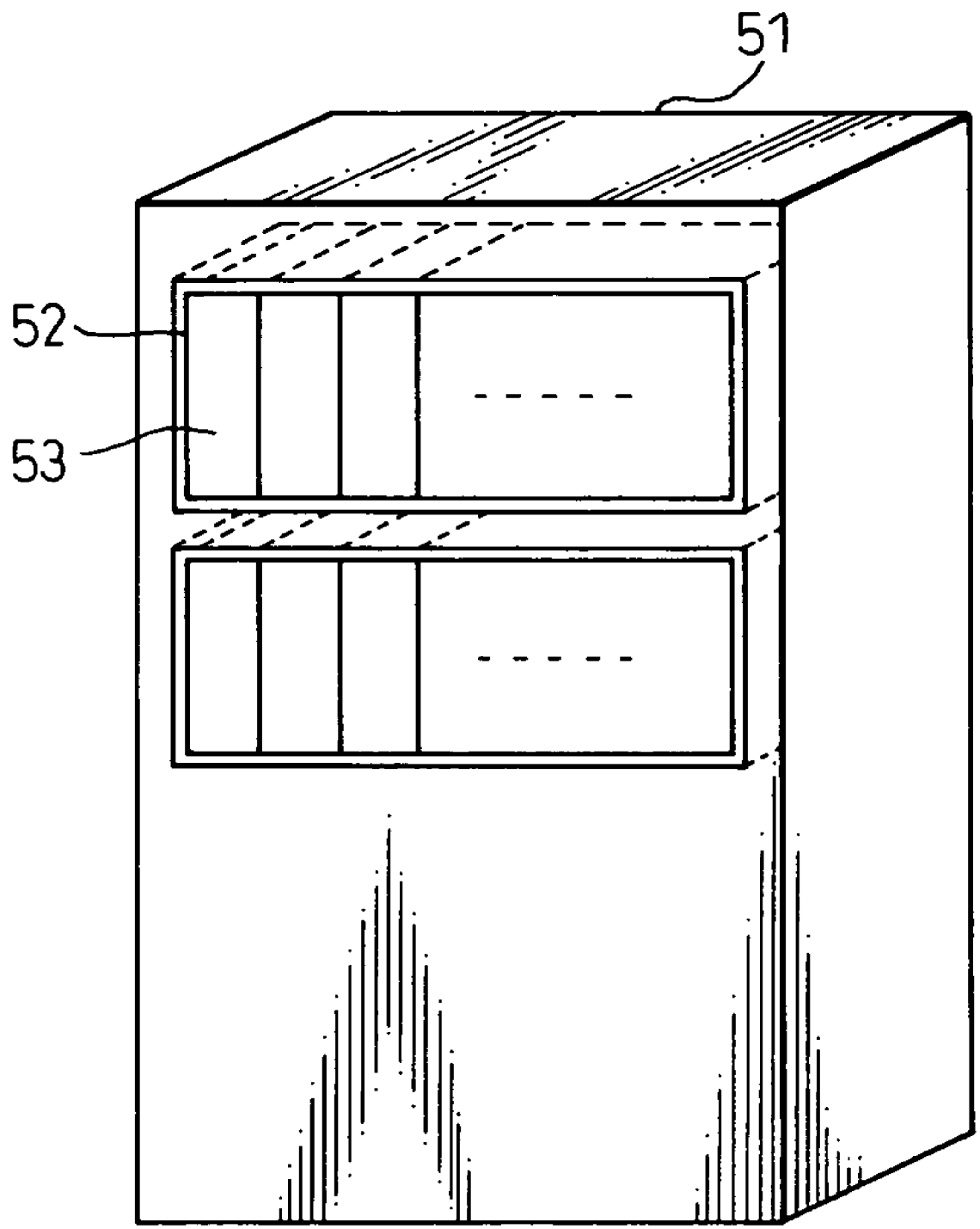
FIG. 5 is a perspective view showing the appearance of a conventional magnetic disk loading apparatus.

As mentioned above, as the magnetic disk units 13-1, 13-2, 13-3, etc. are inserted into the magnetic disk loading apparatus 11 from the flank of the magnetic disk loading apparatus, a larger number of magnetic disk units can be mounted in the magnetic disk loading apparatus than in the conventional magnetic disk loading apparatus shown in FIG. 5. For example, assuming that fifteen magnetic disk units 53 can be mounted on the front face of the lowest stack of the disk enclosure 52 of the conventional apparatus shown in FIG. 5, and that the magnetic disk loading apparatus 11 shown in FIG. 1 and FIG. 2 has the same size as the magnetic disk loading apparatus 51 shown in FIG. 5, when sixty magnetic disk units can be mounted in the magnetic disk loading apparatus 11 shown in FIG. 1 from the flank of the apparatus, a number of magnetic disk units that is four times larger than 15 magnetic disk units can be mounted in the magnetic disk loading apparatus 11. In the example shown in FIG. 2, the four disk enclosures 12 are mounted in the magnetic disk loading apparatus 11 from the rear side of magnetic disk loading apparatus 11. Therefore, 240 magnetic disk units, that is a number of magnetic disk units four times larger than 60 magnetic disk units, can be mounted in the magnetic disk loading apparatus 11. Conventionally, magnetic disk units are mounted on the face and back of the magnetic disk loading apparatus 51 on a fixed basis. A large area in the magnetic disk loading apparatus 51 is unused and left vacant. In the embodiment of the present invention shown in FIG. 1 and FIG. 2, the magnetic disk units 13-1, 13-2, 13-3, etc. are inserted into the magnetic disk loading apparatus 11 from the flank of the magnetic disk loading apparatus. The unused vacant area can be minimized.

Referring to FIG. 1, when the magnetic disk units 13-1, 13-2, etc. are maintained or inspected, the pull 15 is held in order to pull the disk enclosure 12 leftward in the drawing. Consequently, the disk enclosure 12 is slid to move within the magnetic disk loading apparatus 11 and is pulled out as indicated with a chain double-dashed line. Along with the pulling out, the cable guide 16 is moved to a position indicated with a chain double-dashed line with the fixing point 17 as a fulcrum. As the cables are moved along with the pulling out of the disk enclosure 12 while being protected by the cable guide 16, a load on the cables derived from the movement is limited. Moreover, the magnetic disk units 13-1, 13-2, etc. can be easily maintained or inspected without the necessity of dismounting them from the magnetic disk loading apparatus 11. Moreover, the work of dismounting the cables and maintaining or inspecting them or replacing them with new ones is simplified.

Figure 3:
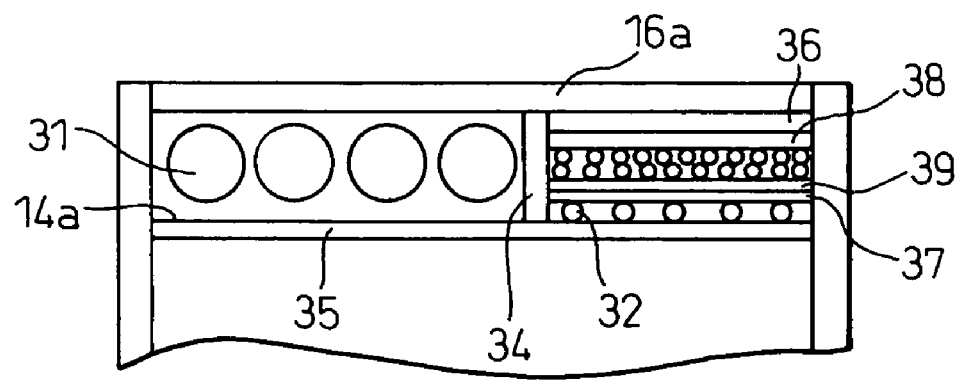
FIG. 3 is a sectional view showing the structure of a cable guide employed in another embodiment of the present invention.

FIG. 3 is a sectional view showing a cable guide 16a employed in another embodiment of the present invention. Referring to FIG. 3, there are shown a cable container 14a, a chain guide 16a, ac cables 31, signal cables 32, optical cables 33, partition panels 34, 35, 36, and 37 used to separate different kinds of cables, and buffer cushions 38 and 39 for protecting the optical cables from being compressed. The material of the partition panels may be a plastic or a metal as long as it is strong enough to protect the cables. Moreover, the number of partition panels and the locations of the buffer cushions are arbitrarily determined based on the number of kinds of cables and the nature of the cables.

Since the partition panels and buffer cushions are included as shown in FIG. 3, the cables are contained in the cable container 14a while being straightened, that is, they are grouped into different kinds of cables. This is helpful in proceeding with the work of maintenance or inspection. Moreover, the inclusion of the buffer cushions 38 and 39 is effective in that the optical cables will not be readily damaged even when pressure is applied to the optical cables.

Figure 4:
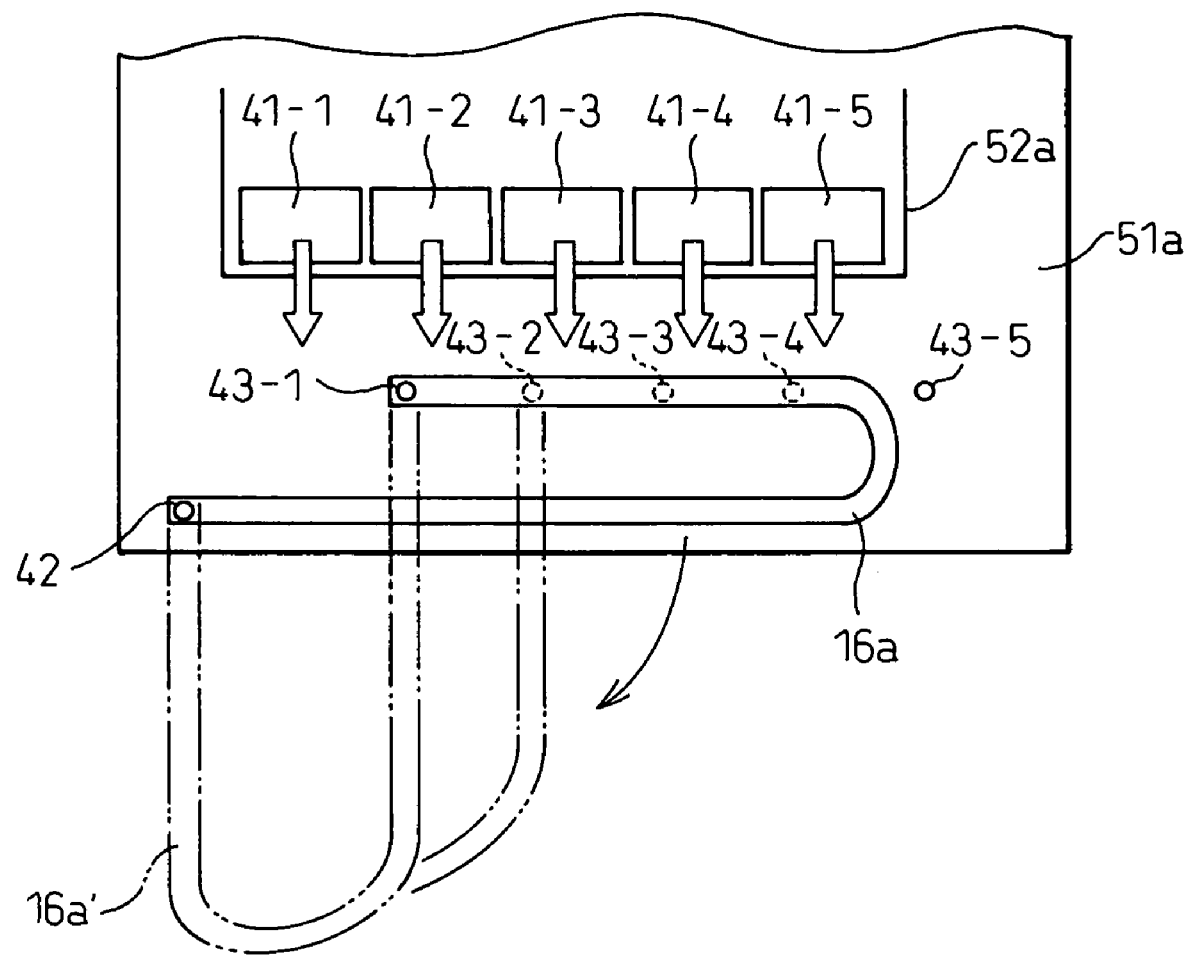
FIG. 4 is a back view of a magnetic disk loading apparatus in accordance with still another embodiment of the present invention.

FIG. 4 is a back view of a magnetic disk loading apparatus in accordance with still another embodiment of the present invention.

Various components 41-1, 41-2, 42-3, etc. other than magnetic disk units are mounted on the back of the magnetic disk loading apparatus. Various cables are disposed in an area where the components are not located. According to the present embodiment of the present invention, the cables are disposed below the components 41-1, 41-2, 41-3, etc. and encased in a cable guide 16a. As the cable guide 16a, the same flexible cable guide as the one shown in FIG. 1, for example, a chain guide, is adopted. Reference numeral 42 denotes a fixed end of the cable guide 16a, and reference numerals 43-1, 43-2, 43-3, etc. denote tentative fixing points at which the other end of the cable guide 16a is fixed.

When maintenance or inspection of components or replacement thereof is not performed, the cable guide 16a is stored in a magnetic disk loading apparatus 51a.

The cable guide 16a is stored in the magnetic disk loading apparatus 51a. For example, when the components 41-3, 41-4, and 41-5 are dismounted from the magnetic disk loading apparatus 51a for the purpose of maintenance or inspection, or replacement with the other end of the cable guide 41a fixed at the tentative fixing point 43-1, the presence of the cable guide 16a interrupts the work. With the cable guide 16a fixed at the fixing point 42 and tentative fixing point 43-1, the cable guide 16a is turned 90° and in the direction of the arrow in the drawing. Thus, the components 41-3, 41-4, and 41-5 are moved as indicated by the arrow to lie below the magnetic disk loading apparatus 51a. Consequently, the components can be dismounted.

In order to maintain or inspect the component 42-2, the tentative fixing point at which the other end of the cable guide 16a is fixed is changed from the point 43-1 to the point 43-2. Thus, the component 41-2 is moved as indicated with the arrow to lie below the magnetic disk loading apparatus 51a. Consequently, the component 51-2 can be dismounted.

As mentioned above, as a flexible cable guide is employed, and tentative fixing points at which the other end of the cable guide is fixed are changed, any of the components in the disk enclosure 52a can be easily replaced with a new one or maintained or inspected.

According to the first aspect of the present invention, a disk enclosure can be moved or slid so that magnetic disk units mounted in a magnetic disk loading apparatus can be easily dismounted. Moreover, the number of magnetic disk units mounted in the magnetic disk loading apparatus is markedly increased.

Furthermore, according to another aspect of the present invention, various cables are encased in a flexible cable guide. The cable guide 16a is turned 90° in a direction opposite to a direction, in which components are located, with the cable guide fixed at the fixing point and tentative fixing point, whereby the components can be easily maintained or inspected or replaced with new ones.

What is claimed is:

1. A magnetic disk loading apparatus for loading magnetic disk units comprising:
   at least one disk enclosure;
   at least one magnetic disk unit stored in the disk enclosure; and
   a cable container located in a place within the disk enclosure other than the place where the magnetic disk unit is located, wherein:
   the magnetic disk loading apparatus is designed so that the disk enclosure can be inserted into or pulled out of the magnetic disk loading apparatus from the front side of the magnetic disk loading apparatus; and
   cables contained in the cable container are coupled to the magnetic disk unit, and encased in a cable guide that can be bent or stretched along with the insertion or pulling out of the disk enclosure.

2. The magnetic disk loading apparatus according to claim 1, wherein the magnetic disk unit is stored in the disk enclosure so that the face thereof will be oriented in a direction orthogonal to the face of the disk enclosure.

3. The magnetic disk loading apparatus according to claim 1, wherein the cable guide includes partition panels used to differentiate places where different kinds of cables are contained.

4. The magnetic disk loading apparatus according to claim 3, wherein buffer cushions are placed on the partition panels.

5. A magnetic disk loading apparatus for loading magnetic disk units, comprising:
   at least one disk enclosure;
   at least one component stored in the disk enclosure;
   a cable container located in a place within the disk enclosure other than the place where the component is located, wherein:
   cables contained in the cable container are coupled to the magnetic disk unit, one end of each cable is fixed at a point in the disk enclosure so that the cable can be turned, and the other end of each cable is attached to any place within the disk enclosure other than the place, where the component is located, so that each cable can be detached and turned;
   when the component is dismounted from the disk enclosure for the purpose of maintenance thereof, if the cables interrupt the work of dismount, the cables are turned to lie outside the disk enclosure or the position at which the other ends of the cables are fixed is changed from one position to another so that the component can be dismounted from the disk enclosure.

* * * * *